J. P. ELLIOTT, DEC'D.
M. B. ELLIOTT, EXECUTRIX.
METHOD OF AND APPARATUS FOR MANUFACTURING SHEETS OF PLASTIC AND FIBROUS MATERIAL.
1,411,330. APPLICATION FILED NOV. 11, 1920. Patented Apr. 4, 1922.
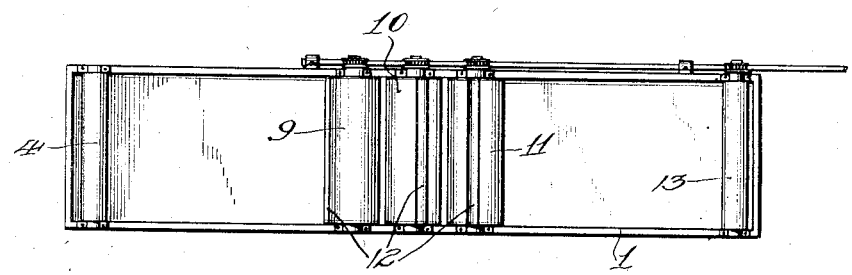
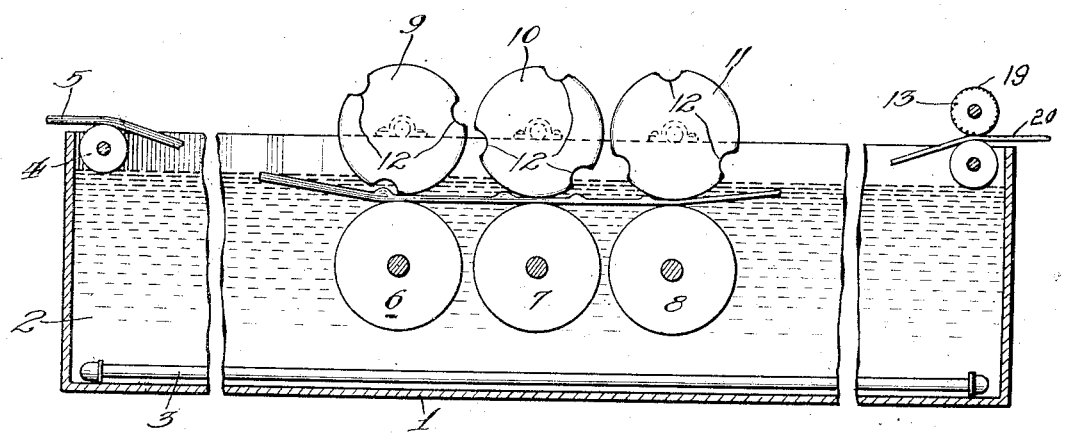
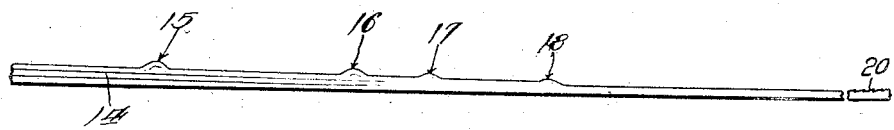

UNITED STATES PATENT OFFICE.

JAMES P. ELLIOTT, OF CHICAGO, ILLINOIS; MARY BRODERS ELLIOTT EXECUTRIX OF SAID JAMES P. ELLIOTT, DECEASED.

METHOD OF AND APPARATUS FOR MANUFACTURING SHEETS OF PLASTIC AND FIBROUS MATERIAL.

1,411,330.     Specification of Letters Patent.     Patented Apr. 4, 1922.

Application filed November 11, 1920. Serial No. 423,254.

*To all whom it may concern:*

Be it known that I, JAMES P. ELLIOTT, a citizen of the United States, residing at Chicago, county of Cook, State of Illinois, have invented a certain new and useful Improvement in Methods of and Apparatus for Manufacturing Sheets of Plastic and Fibrous Material, and declare the following to be a full, clear, and exact description of the same, such as will enable others skilled in the art to which it pertains to make and use the same, reference being had to the accompanying drawings, which form a part of this specification.

In my prior Patent No. 1,352,796, dated September 14, 1920, I have disclosed a process of making sheets out of fibrous material and a material which is cementitious when heated, by first manufacturing sheets out of the fibrous material and the cementitious material in comminuted form in the same way that sheets of paper are made, and then uniting a plurality of such sheets by means of heat and pressure. By controlling the temperature and pressure factors it is possible to secure products varying considerably from each other, between the limits of a composite sheet which consists practically of three layers cemented together and of a solid mass approximating in appearance a mass made out of the cementitious material having distributed throughout the same, however, the reinforcing fibers.

In passing sheets of this kind through squeeze rolls, there is always more or less of a tendency of the material of which the sheets are made to pile up in advance of the rolls, this tendency varying with the heat and the pressure and, in the case of extremely long sheets, it may happen that sufficient tension is imposed upon sections between consecutive sets of rolls to cause the sheets to tear.

The principal object of the present invention is to provide a simple and novel method of and apparatus for producing a composite sheet or body out of a plurality of superposed sheets, whereby any difficulties which might be encountered from the tendency to pile up in advance of the rolls to which I have referred will be entirely avoided and any desired degree of compression or densification of which the material of which the sheets are made is capable, may be secured.

In accordance with my invention I so construct at least one of the squeeze rolls of each set that its cylindrical working face will be interrupted at one or more places measured circumferentially thereof, so that the grip on the work will be released at regular intervals and the work may be freely drawn ahead. The interruptions are made to occur in different angular positions throughout the series of sets which may be employed or else the sets of rolls are so spaced apart from each other that any ridges that are formed across the sheets due to piling up the material in advance of one set of rolls will be engaged by the effective working faces of the next set of rolls and thus be flattened down. In this way each set of rolls will release its grip on the work before the resistance to passage between the rolls through the piling up of the material in advance of the rolls becomes great enough to produce undue pulling stresses on that section of the sheet between that set of rolls and the next set.

The heat to melt the waterprofing material may be applied in any suitable way, either by heating the rolls themselves, or by passing the sheets to be joined together through a hot bath. Where the sheets are passed through a hot bath, the latter is preferably of a non-cementitious nature and some or all of the squeeze rolls are preferably submerged in the same so that they will become coated with the liquid of the bath and will not adhere to the waterproofing material which has been rendered cementitious on account of being heated. Furthermore, the bath may contain a coloring material so that it will serve not only to heat the sheets but also to provide them with a superficial coating of any desired color. Instead of using a hot bath to heat the sheets, the rolls may be heated and adherence between the rolls and the work may be prevented by pouring over the rolls an oily liquid or some other liquid which will secure the desired result. In this case, the liquid which is poured over the rolls may be colored so as to give the surface of the finished product the desired color.

The product of my improved process and machine may be used as a roofing material, in comparatively flexible sheets, as a shingle which may either be comparatively flexible or rigid and which may have any desired thickness, as a wallboard, or generally as lumber adapted not only to displace wood but also corrugated iron and the like.

In order that a fuller understanding of my invention may perhaps be had than will be obtained from the foregoing description, I have illustrated one form of apparatus for carrying out my invention in the accompanying drawing, wherein:

Figure 1 is a plan view of the apparatus;

Fig. 2 is a vertical longitudinal section on a larger scale through such apparatus; and Fig. 3 is an edge view of the work in the process of passing through the machine, illustrating conditions which may arise.

Referring to the drawing, 1 represents a long vat or tank adapted to be filled with a liquid bath, 2, the liquid being kept hot by any suitable heating means such as indicated at 3. At the top of the tank, near one end, is a guide roll, 4, over which are led any desired number of sheets lying one upon the other, these sheets being indicated by the parallel lines 5. The indivdual sheets are preferably of the kind manufactured in accordance with my prior Patent 1,305,081, prior to the heating of the sheets to melt the comminuted asphalt, pitch, gum or other waterproofing material therein and, for the sake of brevity, I shall confine the detailed description to the working of sheets of this kind although my invention is of course not limited in its use to these particular sheets.

Within the tank are a plurality of sets of squeeze rolls with their axes parallel to the axis of the roll 4. In the arrangement shown, there are three of these sets each comprising a lower roll having an uninterrupted cylindrical surface and lying at some distance below the top of the bath, together with an upper mutilated roll. The lower rolls are indicated at 6, 7 and 8 respectively and the upper rolls at 9, 10 and 11, respectively. The upper rolls may be made in any suitable way, conveniently by simply cutting grooves in their peripheral surfaces along lines parallel with their axes. The number of grooves in each roll may be varied. In the arrangement shown, each of the upper rolls has three longitudinal peripheral grooves, 12, spaced 120 degrees apart. The grooves should be proportioned as to width and depth so that the material of the sheets, which has become more or less plastic, due to the heat of the bath, will not pile up in advance of any of the sets of rolls to such an extent that when one of the grooves or interruptions in the working face comes opposite the ridge which may be formed, the ridge will not freely pass between the rolls through the gap afforded by the groove.

The superposed sheets are carried from the roll 4, between the squeeze rolls and then between feed rolls, 13, at the end of the tank opposite to that at which the roll 4 is located. The hot bath renders the material in the sheets, other than the fibrous material, plastic and cementitious, so that when they reach the first set of squeeze rolls they are pressed together and caused to adhere to each other. If the material of the sheets starts to pile up in advance of the first set of feed rolls, a time will come when one of the grooves, 12, comes opposite the high point on the lower feed roll of the set, causing the grip on the composite sheet to be released and permitting the thickened part where the material has piled up, to pass freely between the rolls of the first set. The several sets of rolls may be so disposed that their grip on the work is released simultaneously, reliance being placed on the feed rolls, 13, to carry the work forward, or the grooves in the rolls of the several sets may be placed in different angular positions as shown, so that whenever one set of rolls lets go of the work the next set will still be gripping the work and carrying it ahead. In either case, however, the tension on the sheets will be relieved from time to time so that it cannot become great enough to cause the composite sheet to be torn. The spacing between the sets of rolls, or the relative angular disposition of the grooves in the rolls, or both, should be so arranged that any thickened portion in the work which is allowed to pass on from one set of rolls will be engaged by uninterrupted working faces on another set and thus be ironed down to the thickness of the remainder of the work.

The rolls of each set may be placed somewhat nearer each other than those in the set preceding it so that compression and condensation of the material of which the sheets are made will take place gradually. Thus in Fig. 3 I have illustrated a sheet made of three layers, 14, which, at the point 15, shows a piling up of the material as might happen in advance of the first set of squeeze rolls. Between the points 15 and 16 the sheet is of reduced thickness, there being at the point 16 a slight ridge which has been permitted to pass the first set of rolls by reason of the registration of the ridge with one of the grooves. Between the points 16 and 17 there is a still further reduction in the thickness of the sheet, the point 17 representing a small ridge which has passed between the second set of feed rolls; all of the ridges corresponding to the ridges 15 and 16 that have reached the second set of rolls, having been ironed out. Between the points 17 and 18 the sheet is of the same thickness as between the points 16 and 17. Beyond the point 18 the sheet is slightly thinner than between the points 17 and 18, all of the ridges having been ironed out and probably no new ridges having been formed if the separation between the rolls of the third set be not much less than the separation between the rolls of the second set. In any event if there should be any slight ridges in the right hand end of the sheet, beyond the point 18, they will be ironed out by the plane cylindrical feed rolls, 13.

In the drawings the ridges are shown as being all on one side of the sheet or sheets but it will of course be understood that the illustration is simply diagrammatic and is intended to make clear the principle of my invention and not as an accurate representation of what takes place in practice, as the thickening or bulging of the material may occur on either or both sides of the sheet or sheets in actual practice.

If desired, one or more of the rolls as, for example one of the rolls 13, may have a roughened or ridged surface, as indicated at 19, in order to form shoulders, 20, on the finished product; these shoulders serving to receive keys of cement or plaster when the product is to be coated with cement or other plastic material.

I claim:

1. The method of forming a single sheet out of sheets composed of fibrous material and a material which is cementitious when heated, which consists in laying a plurality of the latter sheets upon each other, drawing them, while heated, between a plurality of sets of squeeze rolls, and at intervals releasing the pressure of the squeeze rolls upon the sheets to relieve the tension in the sheets.

2. The method of forming a single sheet out of sheets composed of fibrous material and a material which is cementitious when heated, which consists in laying a plurality of the latter sheets upon each other, drawing them, while heated, between a plurality of sets of squeeze rolls, and at intervals providing gaps between the feed rolls sufficiently large to permit ridges that may have formed due to piling up of the material in advance thereof to pass freely between the rolls.

3. The method of forming a single sheet out of sheets composed of fibrous material and a material which is cementitious when heated, which consists in laying a plurality of the latter sheets upon each other, drawing them, while heated, between a plurality of sets of squeeze rolls, at intervals releasing the pressure of the squeeze rolls upon the sheets to relieve the tension in the sheets, and keeping the rolls covered with a liquid which will prevent the aforesaid cementitious material from adhering to them.

4. The method of forming a single sheet out of sheets composed of fibrous material and a material which is cementitious when heated, which consists in laying a plurality of the latter sheets upon each other, drawing them, while heated, between a plurality of sets of squeeze rolls, at intervals releasing the pressure of the squeeze rolls upon the sheets to relieve the tension in the sheets, and keeping the rolls covered with a paint-like liquid adapted to color the work and having the property of preventing the cementitious material from adhering to the rolls.

5. The method of forming a single sheet out of sheets composed of fibrous material and a material which is cementitious when heated, which consists in laying a plurality of the latter sheets upon each other, drawing them, while heated, between a plurality of sets of squeeze rolls each having at least one roll provided with an interruption in its cylindrical working face.

6. The method of forming a single sheet out of sheets composed of fibrous material and a material which is cementitious when heated, which consists in laying a plurality of the latter sheets upon each other, drawing them, while heated, between a plurality of sets of squeeze rolls each having at least one roll provided with an interruption in its cylindrical working face so located that it will pass over the work at a different point from that which lay opposite the interruption in the preceding set of rolls when the work passed through the latter.

7. A machine of the character described comprising a pair of squeeze rolls and means for drawing work through said rolls, one of said squeeze rolls having its cylindrical working face interrupted throughout its length and the other roll having an uninterrupted cylindrical surface.

8. The method of forming a single sheet out of sheets composed of fibrous material and a material which is cementitious when heated, which consists in laying a plurality of the latter sheets upon each other, drawing them, while heated, between a plurality of sets of squeeze rolls each having at least one roll provided with an interruption in its cylindrical working face, and forming depressions in the surface of the sheet to receive keys of a plastic coating if the sheet is subsequently to be coated.

In testimony whereof, I sign this specification.

JAMES P. ELLIOTT.